(No Model.)
W. R. FOX.
DADO CUTTER.
No. 447,716. Patented Mar. 3, 1891.
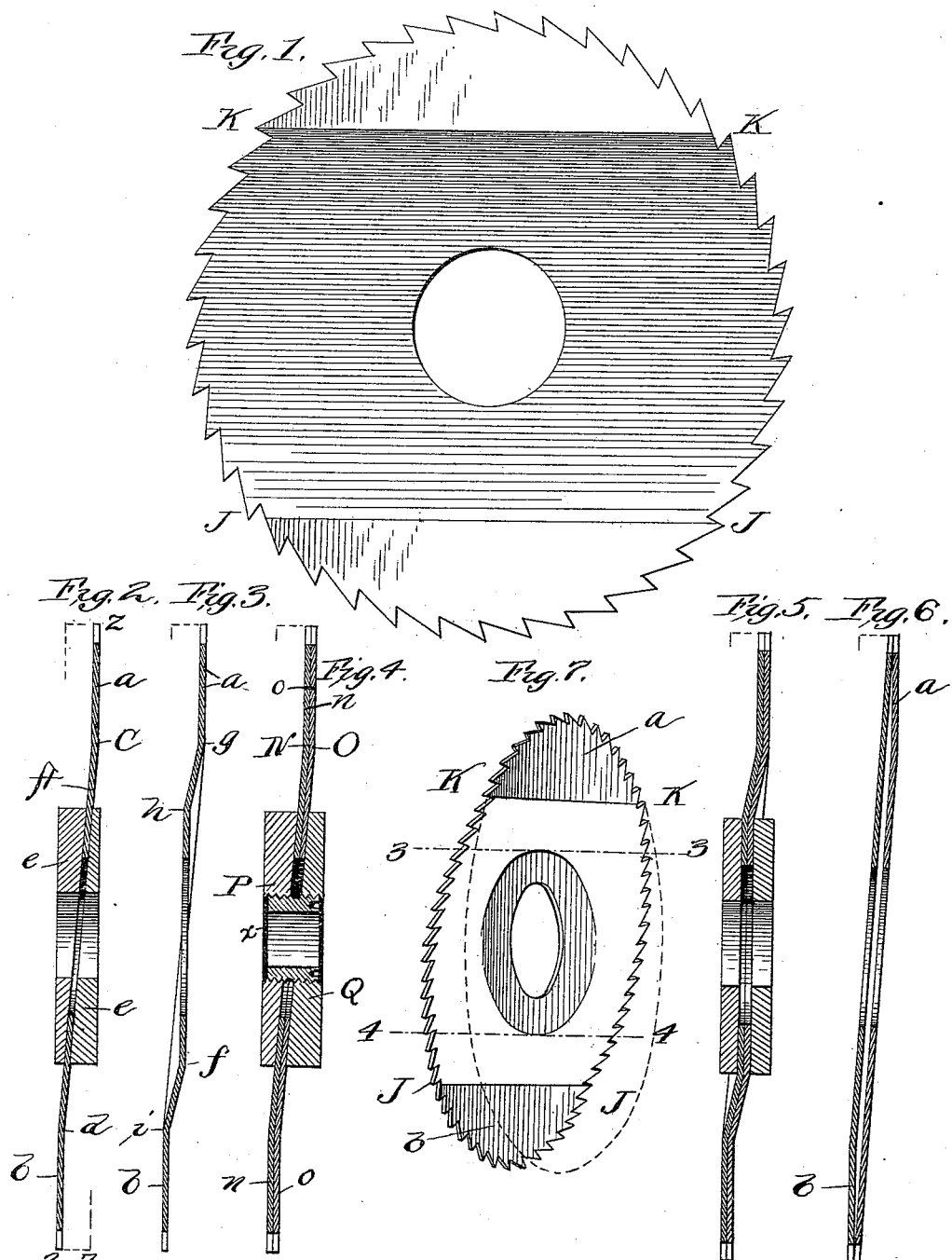

UNITED STATES PATENT OFFICE.

WILLIAM R. FOX, OF GRAND RAPIDS, MICHIGAN.

DADO-CUTTER.

SPECIFICATION forming part of Letters Patent No. 447,716, dated March 3, 1891.

Application filed August 3, 1889. Serial No. 319,611. (No model.)

*To all whom it may concern:*

Be it known that I, WILLIAM R. FOX, of Grand Rapids, in the county of Kent and State of Michigan, have invented a new and useful Improvement in Dado-Cutters; and I do hereby declare that the following is a full, clear, and exact description of the same.

My invention is an improvement in dado-cutters, and of that class of circular saws specifically intended for the purpose of cutting grooves and doing analogous work. In saws of this class there are two distinct objects to be gained in the construction of the different parts of the saw. One of these objects is to have a sufficient surface of the saw to mark the width of the groove and remove the wood next to the wall of the groove and the other is to provide a suitable part of the saw for the purpose of removing the intervening stock.

In the invention hereinafter described I have sought to provide a saw of economical construction, the parts of which are adapted to attain these objects.

In the accompanying drawings, Figure 1 represents a side elevation of my improved saw. Fig. 2 is a section of the same on line x x of Fig. 1, showing the single saw with the collars added, which are not shown in Fig. 1. Fig. 3 shows a modified form of the saw in similar section. Fig. 4 shows in similar section the saw shown in Fig. 1 duplicated. Fig. 5 is a similar duplicated section of the saw shown in Fig. 3. Fig. 6 shows a like section of another modification of a duplicated saw. Fig. 7 is a perspective view of the saw shown in Fig. 3.

In Fig. 1 the saw is shown at A, having a central opening to receive the sleeve. In the section shown in Fig. 2 the part shown above the point C is represented in Fig. 1 by the segment which is bounded by the straight and curved lines K. K. This segment, as shown in the sectional figure, is in a plane at right angles to the axis of the saw. In the same manner the part of the saw shown in section between the point $d$ and the lower edge is the same as that shown in Fig. 1 between the straight and curved lines J J, this being a segment equal to and directly opposite the segment bounded by the chord K K. The part of the saw between these chords from C to $d$ in the sectional Fig. 2 is inclined to the axis of the saw, and the amount of this inclination determines the width of the groove which the saw will cut, and this groove is between the extended planes shown by the dotted lines $z\ z$ and the point 2, which is the outside of the edge of the saw. In this form of saw the beveled collars $e\ e$, which form the hub, must have a bevel corresponding to that of the interior part of the saw between the chord lines heretofore mentioned.

The saw shown in Fig. 3 differs from that shown in Fig. 2 in this respect, that the central portion which is adapted to receive the collars $e\ e$ is formed in a plane at right angles to the axis of the saw. This makes necessary shorter and sharper inclines between the central portion of the saw and the parts $a\ b$, Fig. 3. These inclines are shown in Fig. 7 as lying on one side between the lines J J and and 4 4 and on the other between the lines K K and 3 3, and in Fig. 3 between the points $g\ h$ on one side and $i\ f$ on the other. Between the points $g\ i$ on the edge of the saw the line is straight or slightly curved, the saw receiving a slight twist on each side of the hub from the points $h\ f$. The parts $a\ b$, being the segments shown in Fig. 1, are in planes at right angles to the axis of the saw and these mark and cut the sides of the groove—that is to say, the parts of the periphery lying between the points K K on one side and J J on the other are those parts which cut against the wall of the grooves, while the inclined parts of the segment between the lines J K J K remove the intervening stock.

In the section shown in Fig. 4 the saws N O are exactly the same as that shown in Fig. 2, placed side by side, one N being held in the hub P and the other O being held in the hub Q. These are capable of adjustment by separation, the plain points $n\ o$ in the figure above and below forming the walls of the groove, these being the outer plain faces or segments heretofore described, which are at right angles to the axis of the saw. When the saws are separated, which may be done by the right and left hand screw-threaded sleeve $x$, described in Letters Patent granted to me on the 12th day of June, 1888, No. 384,248, the periphery of the saws between the segments $n\ n$ then remove the intermediate stock. The saws may be separated until the inner face of $o$ on one side is in the same plane with the inner face of o on the other side. This doubles the width of the kerf less the thickness of one saw. Of course any number of such adjustable saws may be used, the number of saws varying the amount of adjustment and consequently the width of cut.

Fig. 5 is a view like that of Fig. 4, representing two saws of the form shown in Fig. 3, and in this form, also, more than two saws may be used, if desired.

The modification shown in Fig. 6 differs from that shown in Fig. 2 only in this respect. It has a double saw capable of adjustment; but each saw has only a segment, as $a$ $b$, respectively, on one side. This cuts in planes parallel to the axis of the walls of the groove, while all of the rest of the saw is inclined and removes the intermediate stock. A single saw of this kind may be used alone, if desired.

I claim as my invention—

1. A saw for cutting grooves, having an inclined portion provided with teeth for removing the intervening stock, and a segment also provided with teeth extending to the periphery from the inclined portion at right angles to the axis, substantially as described.

2. A pair or series of saws for cutting grooves, each having an inclined portion provided with teeth, and a segment also provided with teeth and extending to the periphery from the inclined portion at right angles to the axis, and means for supporting said saws adjustably, substantially as described.

3. A saw having a segment on opposite sides, each in a plane at right angles to the axis of the saws, and an intermediate inclined part, substantially as described.

4. A saw having segments on opposite sides and a central portion in planes at right angles to the axis of the saws, with inclined portions between the central portion and marginal segments, substantially as described.

In testimony whereof I have signed my name to this specification in the presence of two subscribing witnesses.

WILLIAM R. FOX.

Witnesses:
 GEO. G. WHITWORTH,
 CHAS. F. ROOD.